US011924604B2

(12) United States Patent
Sun et al.

(10) Patent No.: US 11,924,604 B2
(45) Date of Patent: Mar. 5, 2024

(54) SPEAKER ADAPTER, AND DUAL CORE SPEAKER ASSEMBLY

(71) Applicant: HARMAN INTERNATIONAL INDUSTRIES, INCORPORATED, Stamford, CT (US)

(72) Inventors: Bo Sun, Jiangsu (CN); Jian Wang, Jiangsu (CN); Cathy Chen, Jiangsu (CN); Na Liu, Jiangsu (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/615,221

(22) PCT Filed: May 31, 2019

(86) PCT No.: PCT/CN2019/089537
§ 371 (c)(1),
(2) Date: Nov. 30, 2021

(87) PCT Pub. No.: WO2020/237627
PCT Pub. Date: Dec. 3, 2020

(65) Prior Publication Data

US 2022/0232315 A1 Jul. 21, 2022

(51) Int. Cl.
*H04R 1/02* (2006.01)
*H04R 1/28* (2006.01)

(52) U.S. Cl.
CPC ........... *H04R 1/2896* (2013.01); *H04R 1/025* (2013.01); *H04R 1/288* (2013.01); *H04R 2499/13* (2013.01)

(58) Field of Classification Search
CPC ...... H04R 1/2896; H04R 1/025; H04R 1/288; H04R 2499/13; H04R 1/227
See application file for complete search history.

(56) References Cited

U.S. PATENT DOCUMENTS 4,733,749 A 3/1988 Newman et al.
6,009,972 A 1/2000 Choi et al.
10,171,897 B2 * 1/2019 Hart ........................ H04R 1/025
10,349,166 B2 * 7/2019 Sahyoun .............. H04R 1/2826
2007/0098204 A1 5/2007 Iekura
2016/0029116 A1 1/2016 Jenkins
(Continued)

FOREIGN PATENT DOCUMENTS

CN 105635892 A 6/2016
CN 205610891 U 9/2016
CN 208836289 U 5/2019
(Continued)

OTHER PUBLICATIONS

Paddock, Paul W. Audio Transducer System, WIPO WO 91/16798. (Year: 1991).*
(Continued)

*Primary Examiner* — Brian Ensey
(74) *Attorney, Agent, or Firm* — Brooks Kushman P.C.

(57) ABSTRACT

The present disclosure provides a speaker adapter, and a dual core speaker assembly. The speaker adapter includes: a main body, symmetrically provided with two mounting portions at both sides for matching with speakers respectively; a bottom base, extending from and around the main body, for supporting the main body; and an inner cavity formed within the main body.

26 Claims, 5 Drawing Sheets

(56) References Cited

U.S. PATENT DOCUMENTS

2019/0090047 A1 3/2019 Ivey

FOREIGN PATENT DOCUMENTS

| | | | |
|---|---|---|---|
| JP | S56116394 | A | 9/1981 |
| JP | S6377297 | A | 4/1988 |
| JP | 2005210176 | A | 8/2005 |
| JP | 2011522454 | A | 7/2011 |
| WO | 2009126396 | A1 | 10/2009 |
| WO | 2017104118 | A1 | 6/2017 |

OTHER PUBLICATIONS

Corynew, David. Loudspeaker Unit, WIPO WO 2019/192816 A1. (Year: 2019).*

International Search Report and Written Opinion dated Mar. 6, 2020 for PCT Application No. PCT/CN2019/089537 filed May 31, 2019, 9 pages.

Office Action for Korean Application No. 2021-7033265 filed Oct. 14, 2021, dated Jun. 29, 2023, 10 pgs.

European Search Report dated Apr. 5, 2023 for European Patent Application No. 19931346.1, 9 pages.

Japanese Office Action dated May 30, 2023 for Japanese Application No. 2021-561686 filed May 31, 2019, 12 pgs.

Japanese Notice of Allowance dated Dec. 4, 2023 for Japanese Application No. 2021-561686 filed Oct. 15, 2021, 3 pgs.

* cited by examiner

SPEAKER ADAPTER, AND DUAL CORE SPEAKER ASSEMBLY

CROSS-REFERENCE TO RELATED APPLICATIONS

This application is the U.S. national phase of PCT Application No. PCT/CN2019/089537 filed on May 31, 2019, the disclosure of which is hereby incorporated in its entirety by reference herein.

FIELD OF INVENTION

The present disclosure relates to a speaker assembly, and more particularly, to a speaker adapter, and a dual core speaker assembly.

BACKGROUND ART

A traditional externally coupled subwoofer (ECS) speaker is a one-core speaker. When the ECS speaker is active, there may exist a package working vibration that causes noise and affects plastic part service life.

To solve the above problem, it has been proposed to fill foam into the adapter. Such a solution may reduce vibration, but at the same time, will increase cost and production process complexities.

Therefore, there is a need for a new type of speaker assembly that can reduce package working vibration and noise, extend plastic part service life due to vibration decreasing, and meanwhile reduce space and cost.

SUMMARY OF THE INVENTION

According to one aspect of the present disclosure, a speaker adapter is provided. The speaker adapter includes: a main body, symmetrically provided with two mounting portions at both sides for matching with speakers respectively; a bottom base, extending from and around the main body, for supporting the main body from bottom; and an inner cavity formed within the main body.

In one embodiment of the present disclosure, the bottom base is open, and the cavity is exposed to the air.

In another embodiment of the present disclosure, the bottom base is closed, which encloses the inner cavity.

Optionally, the cavity can be evacuated, or the cavity can be filled with foam, or the cavity can be filled with air.

In one embodiment of the present disclosure, the volume of the cavity is within a range of 1.2 to 3.5 L.

In one embodiment of the present disclosure, the volume of the cavity is within a range of 6 to 35 L.

In one embodiment of the present disclosure, the speaker adapter is integrally formed.

In one embodiment of the present disclosure, the speaker adapter is made of engineering plastics. Alternatively, the speaker adapter may be made of wooden materials.

According to another aspect of the present disclosure, a dual core speaker assembly is provided. The dual core speaker assembly includes two speakers and a speaker adapter, wherein the two speakers are assembled face to face on the speaker adapter, and the speaker adapter comprises: a main body, symmetrically provided with two mounting portions at both sides for matching with speakers respectively; a bottom base, extending from and around the main body, for supporting the main body from bottom; and an inner cavity formed within the main body.

In one embodiment of the present disclosure, the bottom base is open, and the cavity is exposed to the air.

In one embodiment of the present disclosure, the bottom base is closed, which encloses the inner cavity.

Optionally, the cavity can be evacuated, or the cavity can be filled with foam, or the cavity can be filled with air.

In one embodiment of the present disclosure, the volume of the cavity is within a range of 1.2 to 3.5 L.

In one embodiment of the present disclosure, the volume of the cavity is within a range of 6 to 35 L.

In one embodiment of the present disclosure, the speaker adapter is integrally formed.

In one embodiment of the present disclosure, the speaker adapter is made of engineering plastics. Alternatively, the speaker adapter may be made of wooden materials.

In one embodiment of the present disclosure, the two speakers are both external coupled subwoofers.

In one embodiment of the present disclosure, when the two speakers are mounted on the speaker adapter, the two speakers are spaced apart at a gap that is greater than two times of a maximum displacement of cones of the two speakers.

In one embodiment of the present disclosure, when the two speakers are mounted on the speaker adapter, a product of the gap and a width of each speaker is greater than 80% of an effective area of each cone.

The speaker assembly is mounted inside a vehicle trunk above the wheel hub, or in a spare tire position in the trunk, or under an armrest box or a shift handbrake between a main driving position and a secondary driving position of the vehicle.

When the adapter has an opening structure, body sheet metal parts of a vehicle is formed with at least one opening, the dual core speaker assembly communicates with an engine compartment of the vehicle via the opening, and the dual core speaker assembly is mounted in a cab under vehicle central control.

When the adapter has a closed structure, the dual core speaker assembly is mounted in a cab under vehicle central control, without any opening in vehicle body sheet metal parts.

The speaker assembly of the present disclosure can reduce package working vibration and noise, extend plastic part service life due to vibration decreasing, and meanwhile reduce space and cost. Compared with the traditional one-core ECS speakers, such a speaker assembly as provided in the present disclosure has an increased deep base level and a higher sensitivity.

The significance and benefits of the present disclosure will be clear from the following description of the embodiments. However, it should be understood that those embodiments are merely examples of how the invention can be implemented, and the meanings of the terms used to describe the invention are not limited to the specific ones in which they are used in the description of the embodiments.

Others systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the appended claims.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

BRIEF DESCRIPTION OF THE PREFERRED EMBODIMENTS

Hereinafter, the preferred embodiment of the present invention will be described in more detail with reference to the accompanying drawings. In the following description of the present invention, a detailed description of known functions and configurations incorporated herein will be omitted.

In the following embodiments, an externally coupled subwoofer (ECS) speaker assembly is discussed as an example. It should be understood that the structure and the concept of the present disclosure may be applied to other types of speakers and speaker assemblies that are well known in the art for decreasing vibration and saving cost and space.

To overcome at least some of the problems of traditional speakers, the present disclosure provides a dual core ECS speaker assembly, in which two ECS speakers are assembled face to face on one plastic adapter, as well as an adapter suitable for supporting two ECS speakers so as to constitute such an assembly.

Due to the dual core ECS speaker assembly, a total package working vibration and noise can be reduced. In the meantime, a service life of plastic parts of the speaker assembly can be extended due to a decrease in vibration. Space for accommodating the speaker assembly can be reduced and the total cost can be cut down, due to the use of single one adapter that is suitable for supporting two ECS speakers. In addition, no foam is needed to fill in such an adapter. Furthermore, the dual core ECS speaker assembly possesses improved acoustic performance, such as, increased deep base level and higher sensitivity when compared with the traditional one core ECS speaker assembly.

Hereinafter the structure and concept of the present disclosure will be described more detailed with reference to the drawings. The details and examples are only provided to facilitate understanding of the present disclosure, and should not limit the present disclosure in any way.

Embodiment One

Figure 1:
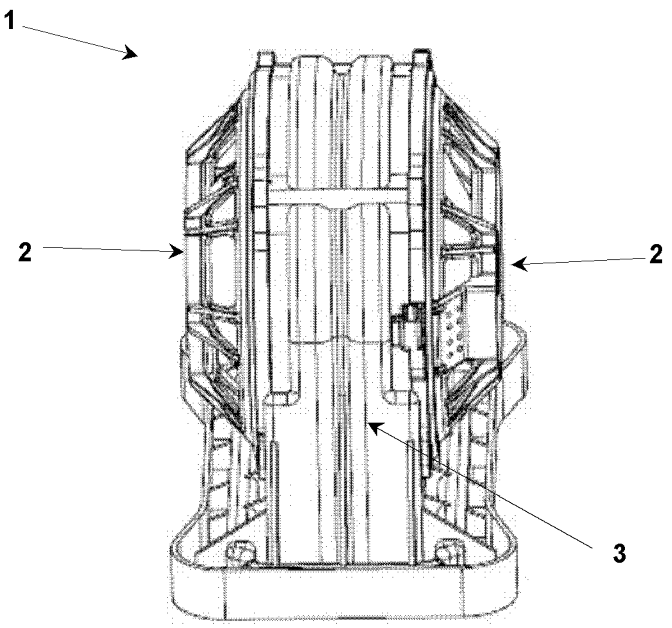
FIG. 1 illustrates a schematic diagram of an assembled state of two ECS speakers assembled face to face on one plastic adapter according to an embodiment of the present disclosure.
Figure 2:
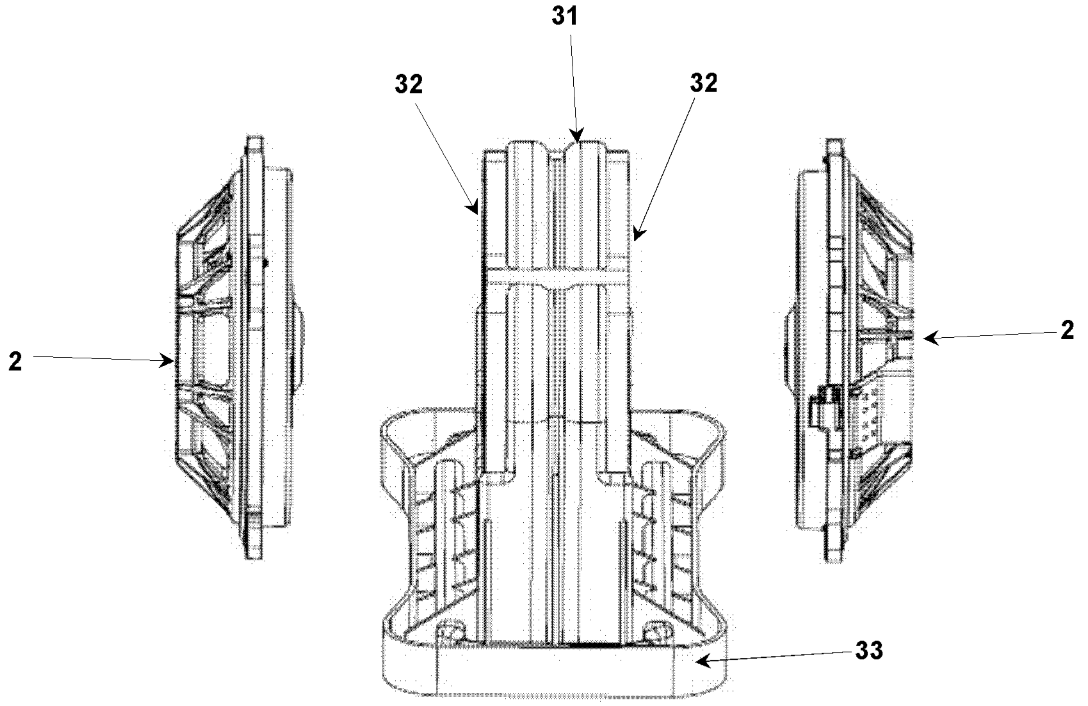
FIG. 2 illustrates a schematic diagram of an un-assembled state of the two ECS speakers and the plastic adapter as shown in FIG. 1.

FIG. 1 illustrates two ECS speakers assembled face to face, on one plastic adapter according to an embodiment of the present disclosure, and FIG. 2 illustrates the separated state of the two ECS speakers and the adapter.

As shown in FIG. 1, a dual core speaker assembly 1 is provided. The dual core speaker assembly 1 includes two speakers 2 and a speaker adapter 3. The two speakers 2 are assembled face to face on the speaker adapter 3.

As shown in FIG. 2, the speaker adapter 3 includes: a main body 31, symmetrically provided with two mounting portions 32 at both sides for matching with speakers 2 respectively; a bottom base 33, extending from and around the main body 31, for supporting the main body 31 from bottom; and an inner cavity 34 (shown in FIG. 8) formed within the main body 31.

Optionally, the inner cavity can be evacuated, or the inner cavity can be filled with foam, or the inner cavity can be filled with air.

As an example, the speaker adapter is integrally formed, and the speaker adapter is made of engineering plastics, such as, Polycarbonate (PC), Polypropylene (PP), Acrylonitrile Butadiene Styrene (ABS), Polypropylene Terepthalate (PPT) etc. Alternatively, the speaker adapter may also be made of wooden materials, such as, solid wood, Medium Density Fiberboard (MDF), and etc.

In the present embodiment, the two speakers are both ECSs. However, it should be understood that the other types of speaker can also be used for the dual-core speaker assembly, as long as the adapter is designed to match with the speakers to be assembled thereon.

Figure 3:
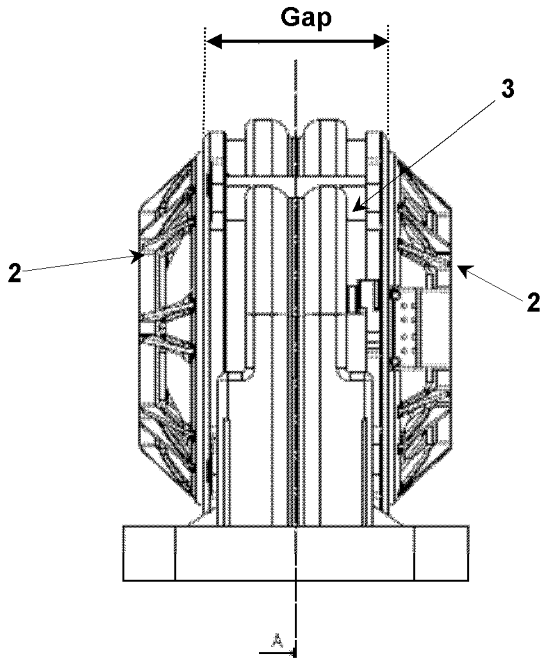
FIG. 3 illustrates a schematic diagram of the side view of the assembled state of the two ECS speakers assembled face to face on one plastic adapter as shown in FIG. 1.

When the two ECS speakers are mounted on the speaker adapter, the two speakers are spaced apart at a gap that is greater than two times of a maximum displacement of cones of the two speakers, as shown in FIG. 3.

Furthermore, when the two speakers are mounted on the speaker adapter, a product of the gap and a width of each speaker is greater than 80% of an effective area of each cone.

Figure 4:
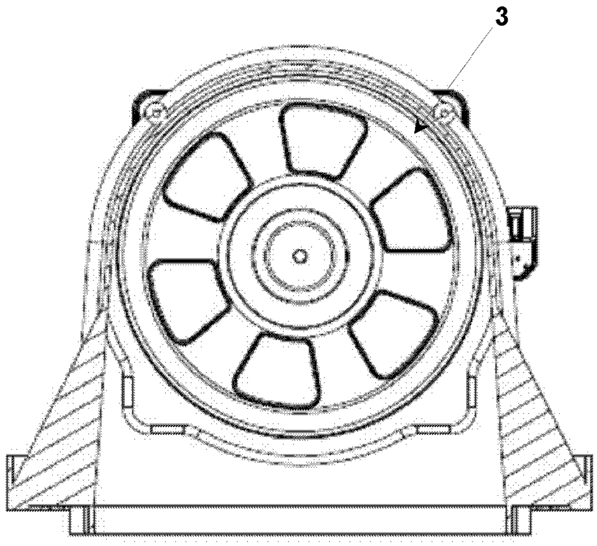
FIG. 4 illustrates a schematic diagram of the sectional view taken along the A-A line in FIG. 3.
Figure 5:
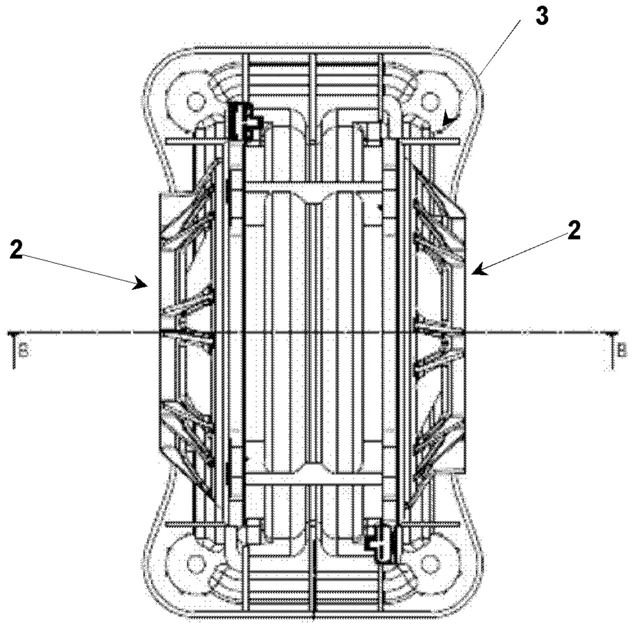
FIG. 5 illustrates a schematic diagram of the top view of the assembled state of the two ECS speakers assembled face to face on one plastic adapter as shown in FIG. 1.
Figure 6:
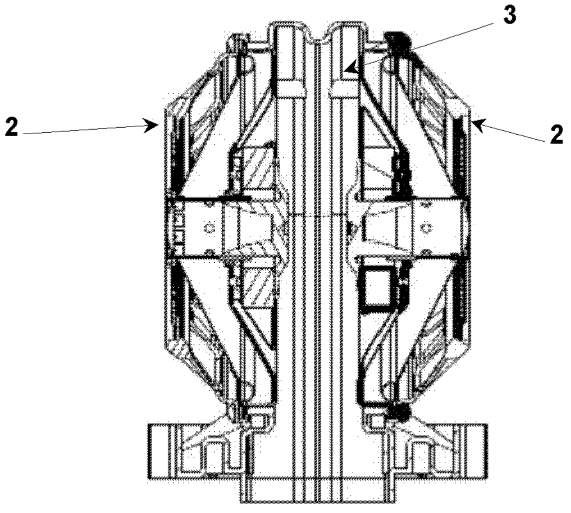
FIG. 6 illustrates a schematic diagram of the sectional view taken along the B-B line in FIG. 5.

When the two ECS speakers are assembled on the mounting portions 32 of the adapter 3, the side view thereof is shown in FIG. 3, and the top view is shown in FIG. 5. When taken along the A-A line as shown in FIG. 3, the sectional view is illustrated in FIG. 4; and when taken along the B-B line as shown in FIG. 5, the sectional view is illustrated in FIG. 6. It can be seen that the structure of the adapter is symmetrical, and the mounting portions 32 is adapted to match with the ECS speakers.

Optionally, the ECS speakers 2 may be assembled on the adapter 3 in a detachable way or an un-detachable way. They may be connected with each other in any conventional way in the art. For example, the speakers may be stuck onto the adapter, or, be fastened on the adapter, and the present disclosure should not be limited to this.

Figure 7:
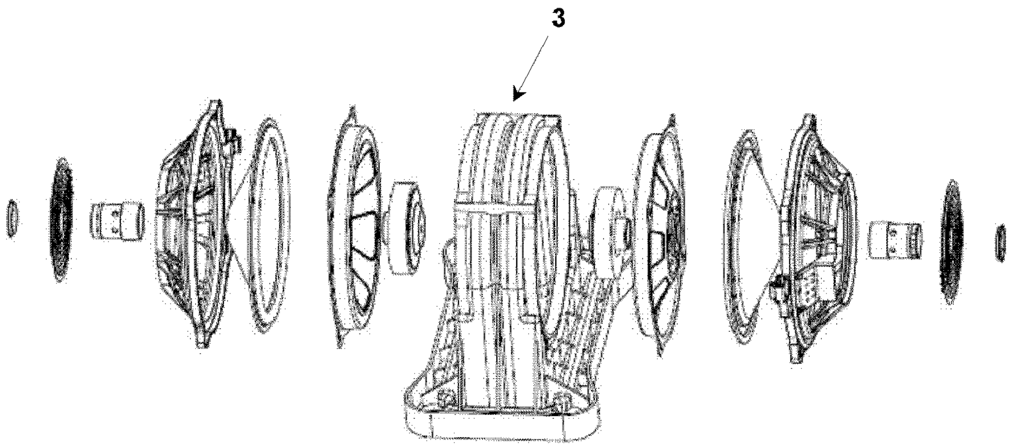
FIG. 7 illustrates a schematic diagram of the isometric view of the two ECS speakers and the plastic adapter in a separated state.

FIG. 7 illustrates a schematic diagram of the isometric view of the two ECS speakers and the plastic adapter in a separated state. From FIG. 7, the structure of the ECS speakers can be clearly seen. In FIGS. 1-9, ECS speakers are shown as an example. However, it should be understood that the other types of speaker can also be used for the dual-core speaker assembly, as long as the adapter is designed to match with the speakers to be assembled thereon. Thus, the detailed description of the ECS speaker structure will be omitted herein.

Figure 8:
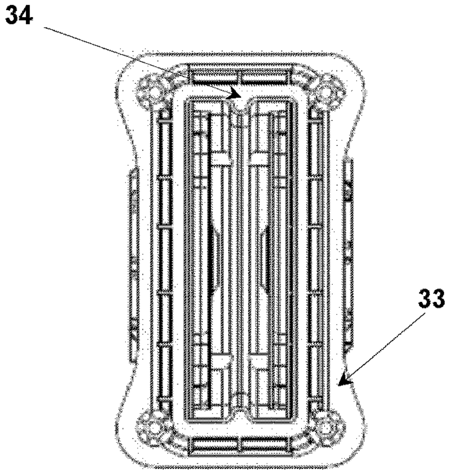
FIG. 8 illustrates a schematic diagram of the bottom view of the plastic adapter according to an embodiment of the present disclosure.

FIG. 8 illustrates a schematic diagram of the bottom view of the plastic adapter according to the above embodiment. As shown in FIG. 8, the plastic adapter has an open structure, and the bottom base 33 includes only a surrounding portion around the bottom edge of the main body, for supporting the adapter in such a way that the adapter can stand on a plane. In this situation, the inner cavity 34 formed in the main body is exposed to the air.

When the plastic adapter has an open structure, the volume of the inner cavity is within a range of 1.2 to 3.5 L. The dual core speaker assembly can work when the volume of the inner cavity is outside the above range, but the performance will be decreased.

Such a dual core speaker assembly whose adapter has an open structure may be mounted at, for example, in the trunk of a vehicle. In this situation, the body sheet metal parts of the vehicle needed to be formed with at least one opening.

For example, the speaker assembly can be mounted inside the vehicle body above the wheel hub (inside the trunk), or alternatively, in the spare tire position in the trunk, or alternatively, under the armrest box or the shift handbrake, between the main driving position and the secondary driving position. Since the adapter has an open structure, the opening of the speaker assembly may communicate with the engine compartment via a body sheet metal opening, while the speaker is mounted in the cab, under the central control.

The disclosed dual core ECS speaker assembly reduces a total package working vibration and noise. In addition, the discloses dual core ECS speaker assembly provides an extended service life of plastic parts of the speaker assembly due to a decrease in vibration. Space for accommodating the speaker assembly can be reduce and the total cost can be cut down, due to the use of single one adapter that is suitable for supporting two ECS speakers, and no foam is needed to fill in such an adapter. Furthermore, the dual core ECS speaker assembly possesses improved acoustic performance, such as, increased deep base level and higher sensitivity when compared with the traditional one core ECS speaker assembly.

Figure 11:
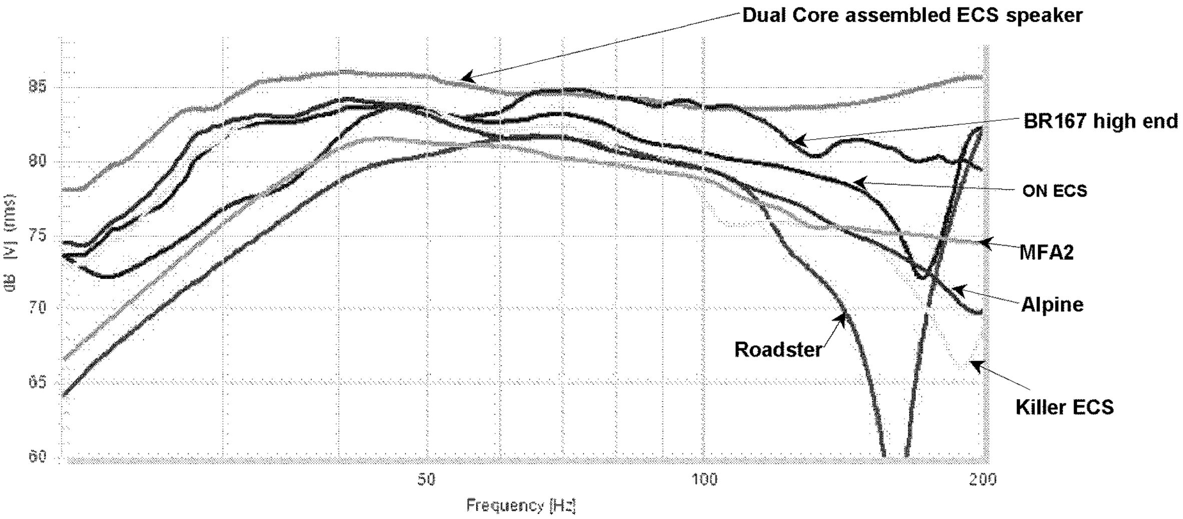
FIG. 11 shows a diagram of fundamental and harmonic distortion components of the dual core ECS speaker assembly according the present disclosure and other types of traditional ECS speakers as a function of frequency.

FIG. 11 shows a diagram of fundamental and harmonic distortion components of the dual core ECS speaker assembly according the present disclosure and other types of traditional ECS speakers as a function of frequency.

As shown in FIG. 11, all speaker sensitivity was measured by 1 m/1 W. In 20 Hz, the dual core assembled ECS sensitivity is higher than others over 3 dB. In 30 Hz-50 Hz, the dual core assembled ECS sensitivity is higher than others over 2 dB. Thus, it can be seen that the dual core assembled ECS speakers has the best sensitivity among those speakers shown in FIG. 11.

Embodiment Two

Figure 9:
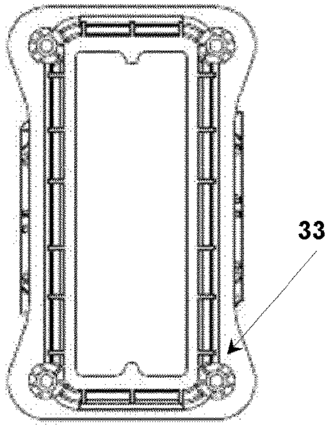
FIG. 9 illustrates a schematic diagram of the bottom view of the plastic adapter according to another embodiment of the present disclosure.

A dual core ECS speaker assembly is provided in this embodiment, which is very similar with that of the aforesaid embodiment one, and the only difference is that, as shown in FIG. 9, the plastic adapter of the present embodiment has a closed structure.

FIG. 9 illustrates a schematic diagram of the bottom view of the plastic adapter according to another embodiment of the present disclosure. As shown in FIG. 9, in addition to the surrounding portion around the bottom edge of the main body, the bottom base 33 further includes a surface which encloses the inner cavity 34 together with the main body.

When the plastic adapter has a closed structure, the volume of the inner cavity is within a range of 6 to 35 L. If the volume is smaller than 6 L, the performance will be decreased. As for the situation that the volume is greater than 35 L, more space for accommodate the speaker assembly will be needed while the performance may not be improved significantly.

The speaker assembly can be mounted inside the vehicle body above the wheel hub (inside the trunk), or alternatively, in the spare tire position in the trunk, or alternatively, under the armrest box or the shift handbrake, between the main driving position and the secondary driving position. For example, the speaker may be mounted in the cab, under the central control, without any body sheet metal opening needed.

Embodiment Three

Figure 10:
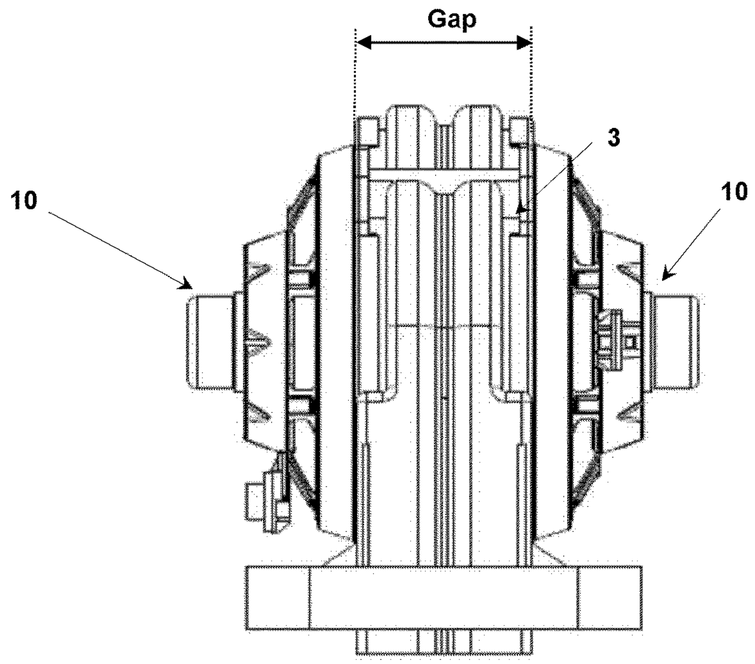
FIG. 10 illustrates a schematic diagram of an assembled state of two speakers assembled face to face on one plastic adapter according to another embodiment of the present disclosure.

In the dual core speaker assembly provided in the present embodiment, the speaker adapter 3 is the same as those described in the aforesaid embodiment one and embodiment two, and the difference is that, as shown in FIG. 10, the two speakers 10 assembled on the adapter are another type of speaker that is different from ECS speakers. For example, the speakers 10 may be subwoofer speakers, mid-woofer speakers, or midrange speakers, and etc.

FIG. 10 illustrates a schematic diagram of an assembled state of two speakers assembled face to face on one plastic adapter according to another embodiment of the present disclosure. It should be noted that the two speakers can be any conventional type of speakers used in the art.

In the present embodiment, the two speakers 10 may be both sub-woofer speakers, or alternatively, they are both mid-woofer speakers; or alternatively, they are both midrange speakers. The adapter is designed to match with the speakers to be assembled thereon.

When the two speakers 10 are mounted on the speaker adapter 3, the two speakers 10 are spaced apart at a gap that is greater than two times of a maximum displacement of cones of the two speakers, as shown in FIG. 10.

Furthermore, when the two speakers 10 are mounted on the speaker adapter 3, a produce of the gap and a width of each speaker is greater than 80% of an effective area of each cone.

The mounting location of the speaker assembly of this embodiment may be the same as those described above. That is, the speaker assembly can be mounted inside the vehicle body above the wheel hub (inside the trunk), or alternatively, in the spare tire position in the trunk, or alternatively, under the armrest box or the shift handbrake, between the main driving position and the secondary driving position. If the adapter has an open structure, the opening of the speaker assembly may communicate with the engine compartment via a body sheet metal opening, while the speaker is mounted in the cab, under the central control. If the adapter has a closed structure, then the optional mounting positions are the same as those of the open structure case, without any body sheet metal opening needed.

Embodiment Four

In the present embodiment, an exemplary speaker adapter used in a dual core speaker assembly is provided.

Reference is now made to FIG. 2, the speaker adapter 3 includes: a main body 31, symmetrically provided with two mounting portions 32 at both sides for matching with speakers 2 respectively; a bottom base 33, extending from and around the main body 31, for supporting the main body 31 from bottom; and an inner cavity 34 (shown in FIG. 8) formed within the main body 31.

Optionally, the inner cavity can be evacuated, or the inner cavity can be filled with foam, or the inner cavity can be filled with air.

As an example, the speaker adapter is integrally formed, and the speaker adapter is made of engineering plastics, such as, PC, PP, ABS, PPT and etc. Alternatively, the speaker adapter may also be made of wooden materials, such as, solid wood, MDF, and etc.

In the present embodiment, the two speakers shown in the figure are both ECSs. However, it should be understood that the other types of speakers can also be used for the dual-core speaker assembly, as long as the adapter is designed to match with the speakers to be assembled thereon. The present disclosure should not be limited to the specific examples shown in the figures. The two speakers may be both sub-woofer speakers, or alternatively, they are both mid-woofer speakers; or alternatively, they are both mid-range speakers. The adapter is designed to match with the speakers to be assembled thereon.

The adapter is designed so that when the two ECS speakers are mounted on the speaker adapter, the two speakers are spaced apart at a gap that is greater than two times of a maximum displacement of cones of the two speakers, as shown in FIG. 3.

Furthermore, the adapter is designed in such a way that when the two speakers are mounted on the speaker adapter, a product of the gap and a width of each speaker is greater than 80% of an effective area of each cone.

When the two ECS speakers are assembled on the mounting portions 32 of the adapter 3, the side view thereof is shown in FIG. 3, and the top view is shown in FIG. 5. When taken along the A-A line as shown in FIG. 3, the sectional view is illustrated in FIG. 4; and when taken along the B-B line as shown in FIG. 5, the sectional view is illustrated in FIG. 6. It can be seen that the structure of the adapter is symmetrical, and the mounting portions 32 is adapted to match with the ECS speakers to be mounted thereon.

Optionally, the adapter is designed so that the ECS speakers 2 may be assembled on the adapter 3 in a detachable way or an un-detachable way. For example, the speakers may be stuck onto the adapter, or, be fastened on the adapter, and the present disclosure should not be limited to this.

FIG. 8 illustrates a schematic diagram of the bottom view of the plastic adapter according to the above embodiment. As shown in FIG. 8, the plastic adapter has an open structure, and the bottom base 33 includes only a surrounding portion around the bottom edge of the main body, for supporting the adapter in such a way that the adapter can stand on a plane. In this situation, the inner cavity 34 formed in the main body is exposed to the air.

When the plastic adapter has an open structure, the volume of the inner cavity is within a range of 1.2 to 3.5 L. The dual core speaker assembly can work when the volume of the inner cavity is outside the above range, but the performance will be decreased.

Such a dual core speaker assembly whose adapter has an open structure may be mounted at, for example, in the trunk of a vehicle. In this situation, the body sheet metal parts of the vehicle needed to be formed with at least one opening.

For example, the speaker assembly can be mounted inside the vehicle body above the wheel hub (inside the trunk), or alternatively, in the spare tire position in the trunk, or alternatively, under the armrest box or the shift handbrake, between the main driving position and the secondary driving position. Since the adapter has an open structure, the opening of the speaker assembly may communicate with the engine compartment via a body sheet metal opening, while the speaker is mounted in the cab, under the central control.

Due to a speaker adapter as provided in the present embodiment, a dual core speaker assembly can be constructed. The total package working vibration and noise of the dual core assembled speaker can be reduced. In the meantime, a service life of plastic parts of the speaker assembly can be extended due to decrease in vibration. Space for accommodating the speaker assembly can be reduce and the total cost can be cut down, due to the use of single one adapter that is suitable for supporting two ECS speakers. In addition, no foam is needed to fill in such an adapter. Furthermore, the dual core ECS speaker assembly possesses improved acoustic performance, such as, increased deep base level and higher sensitivity when compared with the traditional one core ECS speaker assembly.

Embodiment Five

In this embodiment, another exemplary speaker adapter is provided, which is very similar with the aforesaid embodiment four, and the difference is that, as shown in FIG. 9, the adapter of the present embodiment has a closed structure.

FIG. 9 illustrates a schematic diagram of the bottom view of the plastic adapter. As shown in FIG. 9, in addition to the surrounding portion around the bottom edge of the main body, the bottom base 33 further includes a surface which encloses the inner cavity 34 together with the main body.

In the present embodiment, the two speakers shown in the figure are both ECSs. However, it should be understood that the other types of speaker can also be used for the dual-core speaker assembly, as long as the adapter is designed to match with the speakers to be assembled thereon. The present disclosure should not be limited to the specific examples shown in the figures. The two speakers may be both sub-woofer speakers, or alternatively, they are both mid-woofer speakers; or alternatively, they are both mid-range speakers. The adapter is designed to match with the speakers to be assembled thereon.

The adapter is designed so that when the two ECS speakers are mounted on the speaker adapter, the two speakers are spaced apart at a gap that is greater than two times of a maximum displacement of cones of the two speakers.

Furthermore, the adapter is designed in such a way that when the two speakers are mounted on the speaker adapter, a product of the gap and a width of each speaker is greater than 80% of an effective area of each cone.

When the adapter has a closed structure, the volume of the inner cavity is within a range of 6 to 35 L. If the volume is smaller than 6 L, the performance will be decreased. As for the situation that the volume is greater than 35 L, more space for accommodate the speaker assembly will be needed while the performance may not be improved significantly.

The speaker assembly can be mounted inside the vehicle body above the wheel hub (inside the trunk), or alternatively, in the spare tire position in the trunk, or alternatively, under the armrest box or the shift handbrake, between the main driving position and the secondary driving position. For example, the speaker may be mounted in the cab, under the central control, without any body sheet metal opening needed.

Due to the dual core speaker assembly and the speaker adapter thereof, the total package working vibration and noise can be reduced. In the meantime, a service life of plastic parts of the speaker assembly can be extended due to a decreasing vibration. Space for accommodating the speaker assembly can be reduced and the total cost can be cut down, due to the use of single one adapter that is suitable for supporting two speakers. The anti-vibration effects are significant due to the vibration cancellation between the two speakers, even without foam filled in such an adapter. Furthermore, the dual core speaker assembly possesses improved acoustic performance, such as, increased deep base level and higher sensitivity when compared with the traditional one core ECS speaker assembly.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the disclosure have been described, it will be apparent to those of ordinary skill in the art that many more embodiments and implementations are possible that are within the scope of the disclosure. Accordingly, the disclosure is not to be restricted except in light of the attached claims and their equivalents.

The invention claimed is:

1. A speaker adapter comprising:

a main body, symmetrically provided with two mounting portions at both sides to match with speakers respectively;

a bottom base, extending from and around the main body, to support the main body; and an inner cavity formed within the main body, wherein the bottom base is closed, which encloses the inner cavity, and wherein the inner cavity is evacuated.

2. The speaker adapter of claim 1, wherein the inner cavity is filled with air.

3. The speaker adapter according to claim 1, wherein a volume of the inner cavity is within a range of 6 to 35 L when the bottom base encloses the inner cavity.

4. The speaker adapter of claim 1, wherein the speaker adapter is integrally formed.

5. The speaker adapter of claim 1, wherein the speaker adapter is made of engineering plastics.

6. The speaker adapter of claim 1, wherein the speaker adapter is made of wooden materials.

7. A dual core speaker assembly, comprising two speakers and a speaker adapter, wherein the two speakers are assembled face to face on the speaker adapter, and the speaker adapter comprises:

a main body, symmetrically provided with two mounting portions at both sides to match with speakers respectively;

a bottom base, extending from and around the main body, to support the main body and an inner cavity formed within the main body, wherein the bottom base is closed, which encloses the inner cavity, and wherein the inner cavity is evacuated.

8. The dual core speaker assembly of claim 7, wherein the inner cavity is filled with air.

9. The dual core speaker assembly of claim 7, wherein a volume of the inner cavity is within a range of 6 to 35 L when the bottom base encloses the inner cavity.

10. The dual core speaker assembly of claim 7, wherein the speaker adapter is integrally formed.

11. The dual core speaker assembly of claim 7, wherein the speaker adapter is made of engineering plastics.

12. The dual core speaker assembly of claim 7, wherein the speaker adapter is made of wooden materials.

13. The dual core speaker assembly of claim 7, wherein the two speakers are both external coupled subwoofers.

14. The dual core speaker assembly of claim 7, wherein when the two speakers are mounted on the speaker adapter, and wherein the two speakers are spaced apart at a gap that is greater than two times of a maximum displacement of cones of the two speakers.

15. The dual core speaker assembly of claim 7, and wherein when the two speakers are mounted on the speaker adapter, a product of a gap and a width of each speaker is greater than 80% of an effective area of each cone.

16. The dual core speaker assembly of claim 7, wherein the speaker assembly is one of mounted inside a trunk of a vehicle above a wheel hub, or in a spare tire position in the trunk, or positioned under an armrest box or a shift handbrake between a main driving position and a secondary driving position of the vehicle.

17. The dual core speaker assembly claim 7, wherein body sheet metal parts of a vehicle are formed with at least one opening, wherein the dual core speaker assembly communicates with an engine compartment of the vehicle via the at least one opening, and wherein the dual core speaker assembly is mounted in a cab under a vehicle central control.

18. The dual core speaker assembly of claim 7, wherein the dual core speaker assembly is mounted in a cab under a vehicle central control of a vehicle, without any opening in vehicle body sheet metal parts.

19. A speaker adapter comprising:

a main body, symmetrically provided with two mounting portions at both sides to match with speakers respectively;

a bottom base, extending from and around the main body, to support the main body; and an inner cavity formed within the main body, wherein a volume of the inner cavity is within a range of 1.2 to 3.5 L, and wherein the bottom base is open and the inner cavity is exposed to air.

20. A speaker adapter comprising:

a main body, symmetrically provided with two mounting portions at both sides to match with speakers respectively;

a bottom base, extending from and around the main body, to support the main body; and an inner cavity formed within the main body, wherein a volume of the inner cavity is within a range of 6 to 35 L when the bottom base encloses the inner cavity.

21. A dual core speaker assembly, comprising two speakers and a speaker adapter, wherein the two speakers are assembled face to face on the speaker adapter, and the speaker adapter comprises:

a main body, symmetrically provided with two mounting portions at both sides to match with speakers respectively;

a bottom base, extending from and around the main body, to support the main body and an inner cavity formed within the main body, wherein the bottom base is closed, which encloses the inner cavity, and wherein the inner cavity is filled with foam.

22. A dual core speaker assembly, comprising two speakers and a speaker adapter, wherein the two speakers are assembled face to face on the speaker adapter, and the speaker adapter comprises:

a main body, symmetrically provided with two mounting portions at both sides to match with speakers respectively;

a bottom base, extending from and around the main body, to support the main body and an inner cavity formed within the main body, wherein the bottom base is open, and the inner cavity is exposed to air, wherein a volume of the inner cavity is within a range of 1.2 to 3.5 L when the bottom base is open, and the inner cavity is exposed to air.

23. A dual core speaker assembly, comprising two speakers and a speaker adapter, wherein the two speakers are assembled face to face on the speaker adapter, and the speaker adapter comprises:

a main body, symmetrically provided with two mounting portions at both sides to match with speakers respectively;

a bottom base, extending from and around the main body, to support the main body and an inner cavity formed within the main body, wherein when the two speakers are mounted on the speaker adapter, and wherein the two speakers are spaced apart at a gap that is greater than two times of a maximum displacement of cones of the two speakers.

24. A dual core speaker assembly, comprising two speakers and a speaker adapter, wherein the two speakers are assembled face to face on the speaker adapter, and the speaker adapter comprises:

a main body, symmetrically provided with two mounting portions at both sides to match with speakers respectively;

a bottom base, extending from and around the main body, to support the main body and an inner cavity formed within the main body, wherein when the two speakers are mounted on the speaker adapter, a product of a gap and a width of each speaker is greater than 80% of an effective area of each cone.

25. A dual core speaker assembly, comprising two speakers and a speaker adapter, wherein the two speakers are assembled face to face on the speaker adapter, and the speaker adapter comprises:

a main body, symmetrically provided with two mounting portions at both sides to match with speakers respectively;

a bottom base, extending from and around the main body, to support the main body and an inner cavity formed within the main body, wherein body sheet metal parts of a vehicle are formed with at least one opening, wherein the dual core speaker assembly communicates with an engine compartment of the vehicle via the at least one opening, and wherein the dual core speaker assembly is mounted in a cab under a vehicle central control.

26. A dual core speaker assembly, comprising two speakers and a speaker adapter, wherein the two speakers are assembled face to face on the speaker adapter, and the speaker adapter comprises:

a main body, symmetrically provided with two mounting portions at both sides to match with speakers respectively;

a bottom base, extending from and around the main body, to support the main body and an inner cavity formed within the main body, wherein the bottom base is closed, which encloses the inner cavity, and wherein the dual core speaker assembly is mounted in a cab under a vehicle central control of a vehicle, without any opening in vehicle body sheet metal parts.

* * * * *